(12) United States Patent
Neal

(10) Patent No.: US 7,009,628 B2
(45) Date of Patent: Mar. 7, 2006

(54) METHOD AND APPARATUS FOR AUTO-GENERATION OF HORIZONTAL SYNCHRONIZATION OF AN ANALOG SIGNAL TO A DIGITAL DISPLAY

(75) Inventor: Greg Neal, San Jose, CA (US)

(73) Assignee: Genesis Microchip Inc., Alviso, CA (US)

( * ) Notice: Subject to any disclaimer, the term of this patent is extended or adjusted under 35 U.S.C. 154(b) by 345 days.

(21) Appl. No.: 10/226,432

(22) Filed: Aug. 22, 2002

(65) Prior Publication Data

US 2003/0052898 A1    Mar. 20, 2003

Related U.S. Application Data

(60) Provisional application No. 60/323,968, filed on Sep. 20, 2001.

(51) Int. Cl.
*G09G 5/02* (2006.01)

(52) U.S. Cl. .................. 345/699; 345/3.3; 348/536; 348/537

(58) Field of Classification Search ........ 345/110–111, 345/698–699, 3.1–3.4, 204, 211, 213, 619, 345/87, 88, 98–100, 545; 348/536, 540, 348/537, 571–573
See application file for complete search history.

(56) References Cited

U.S. PATENT DOCUMENTS

| | | | | |
|---|---|---|---|---|
| 5,717,469 A | * | 2/1998 | Jennes et al. ............... | 348/571 |
| 5,731,843 A | * | 3/1998 | Cappels, Sr. ................ | 348/537 |
| 5,805,233 A | * | 9/1998 | West ........................... | 348/537 |
| 5,841,430 A | * | 11/1998 | Kurikko ...................... | 345/213 |
| 5,874,937 A | * | 2/1999 | Kesatoshi .................... | 345/428 |
| 6,005,557 A | | 12/1999 | Wong | |
| 6,097,437 A | * | 8/2000 | Hwang ........................ | 348/441 |
| 6,097,444 A | | 8/2000 | Nakano | |
| 6,268,848 B1 | | 7/2001 | Eglit | |
| 6,313,822 B1 | * | 11/2001 | McKay et al. .............. | 345/698 |
| 6,340,993 B1 | * | 1/2002 | Hasegawa et al. .......... | 348/572 |
| 6,452,592 B1 | | 9/2002 | Zhang et al. | |
| 6,473,131 B1 | * | 10/2002 | Neugebauer et al. ....... | 348/572 |
| 6,501,310 B1 | * | 12/2002 | Takami ....................... | 327/160 |
| 6,522,365 B1 | * | 2/2003 | Levantovsky et al. ...... | 348/537 |
| 6,559,837 B1 | * | 5/2003 | Lasneski et al. ............ | 345/204 |
| 6,664,977 B1 | * | 12/2003 | Masumoto .................. | 345/698 |
| 6,724,381 B1 | | 4/2004 | Sakashita | |
| 6,734,919 B1 | * | 5/2004 | Champion et al. .......... | 348/558 |
| 6,750,855 B1 | | 6/2004 | Von Hase | |
| 6,753,926 B1 | | 6/2004 | Nishino | |
| 2001/0022523 A1 | * | 9/2001 | Takami ....................... | 327/156 |

(Continued)

FOREIGN PATENT DOCUMENTS

JP    10091127 A    *    4/1998

(Continued)

*Primary Examiner*—Henry N. Tran
(74) *Attorney, Agent, or Firm*—Beyer Weaver & Thomas, LLP

(57) ABSTRACT

A method, apparatus, and system for determining a true horizontal resolution of an analog video signal arranged to display a number of features having associated feature edges on a display each of which were created with a true pixel clock is described. For a test horizontal resolution, if it is determined that substantially all of the feature edges have substantially the same phase relationship to a test pixel clock, then the test horizontal resolution is the true horizontal resolution.

26 Claims, 17 Drawing Sheets

U.S. PATENT DOCUMENTS

2002/0080280 A1 * 6/2002 Champion et al. .......... 327/156
2003/0052872 A1 3/2003 Neal
2003/0052898 A1 3/2003 Neal

FOREIGN PATENT DOCUMENTS

JP 10153989 A * 6/1998

* cited by examiner

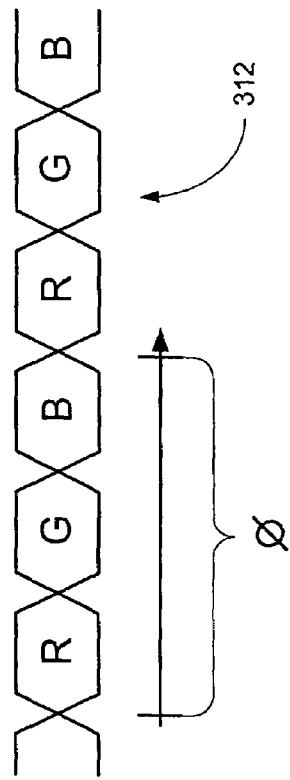
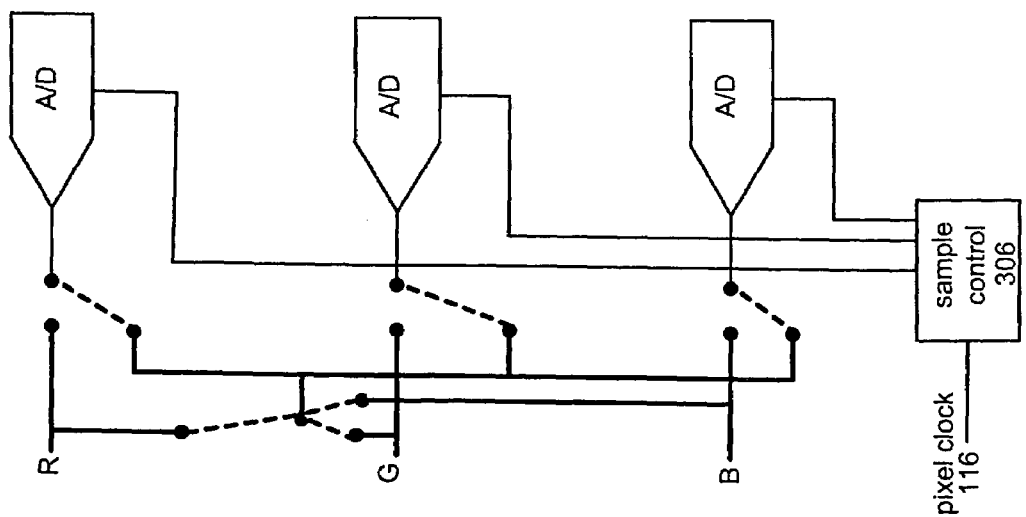
Fig. 3B

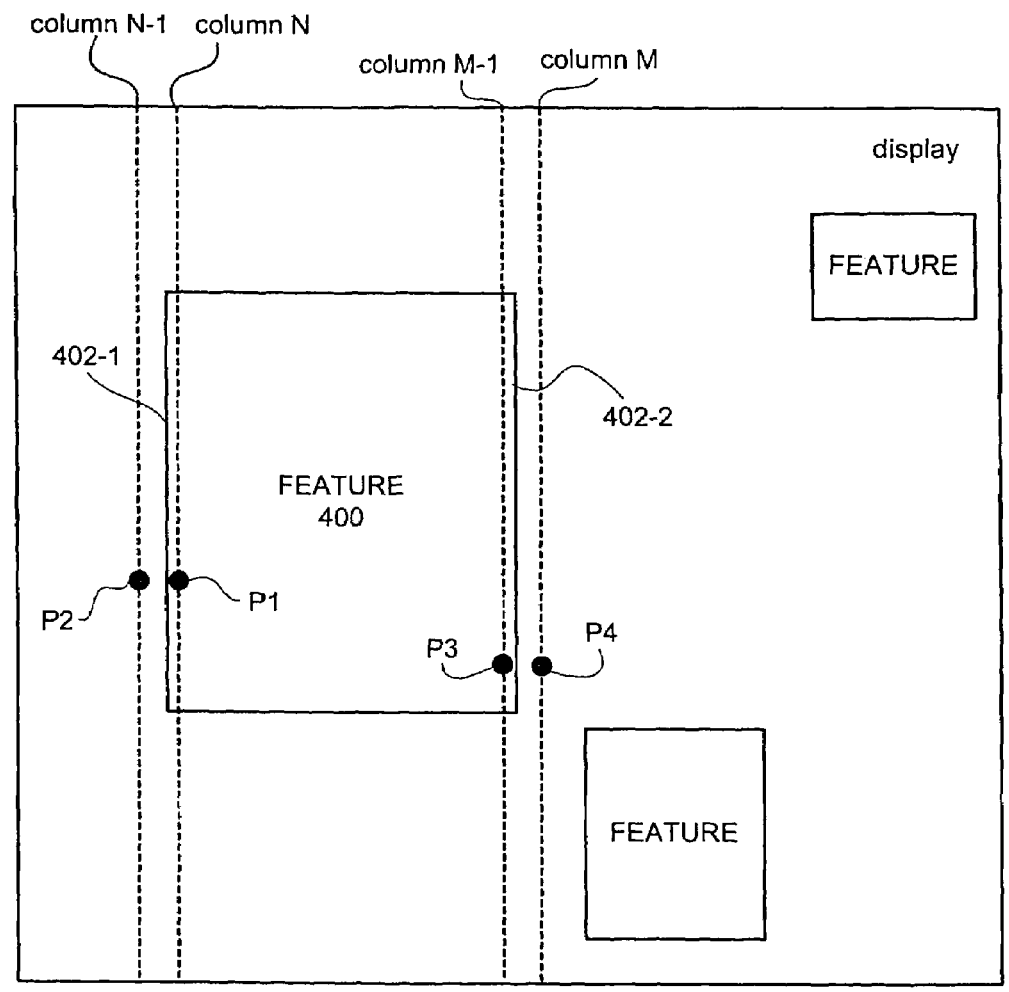
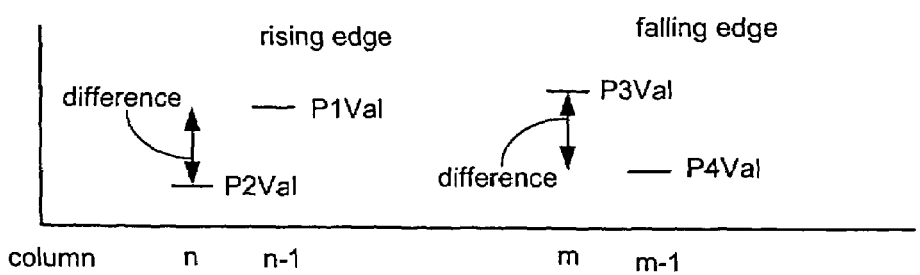
Fig. 4

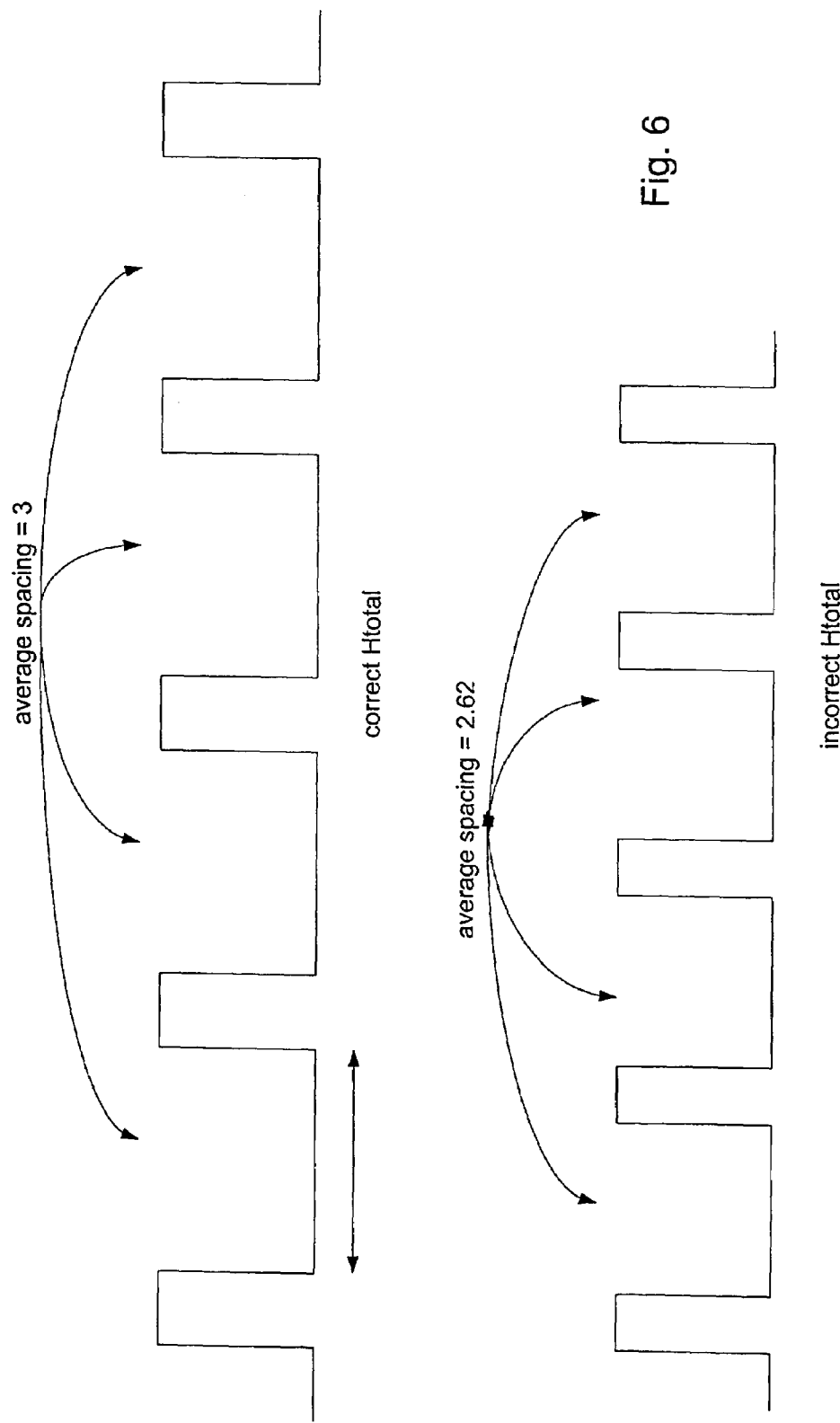

METHOD AND APPARATUS FOR AUTO-GENERATION OF HORIZONTAL SYNCHRONIZATION OF AN ANALOG SIGNAL TO A DIGITAL DISPLAY

CROSS REFERENCE TO RELATED APPLICATIONS

This application takes priority under 35 U.S.C. § 119 (e) of U.S. Provisional Patent Application No. 60/323,968 entitled "METHOD AND APPARATUS FOR SYNCHRONIZING AN ANALOG VIDEO SIGNAL TO AN LCD MONITOR" by Neal filed Sep. 20, 2001 which is incorporated by reference in its entirety for all purposes.

BACKGROUND OF THE INVENTION

I. Field of the Invention

The invention relates to liquid crystal displays (LCDs). More specifically, the invention describes a method and apparatus for automatically determining a horizontal resolution.

II. Description of the Related Art

Digital display devices generally include a display screen including a number of horizontal lines. The number of horizontal and vertical lines defines the resolution of the corresponding digital display device. Resolutions of typical screens available in the market place include 640×480, 1024×768 etc. At least for the desk-top and lap-top applications, there is a demand for increasingly bigger size display screens. Accordingly, the number of horizontal display lines and the number of pixels within each horizontal line has also been generally increasing.

In order to display a source image on a display screen, each source image is transmitted as a sequence of frames each of which includes a number of horizontal scan lines. Typically, a time reference signal is provided in order to divide the analog signal into horizontal scan lines and frames. In the VGA/SVGA environments, for example, the reference signals include a VSYNC signal and an HSYNC signal where the VSYNC signal indicates the beginning of a frame and the HSYNC signal indicates the beginning of a next source scan line. Therefore, in order to display a source image, the source image is divided into a number of points and each point is displayed on a pixel in such a way that point can be represented as a pixel data element. Display signals for each pixel on the display may be generated using the corresponding display data element.

However, in some cases, the source image may be received in the form of an analog signal. Thus, the analog data must be converted into pixel data for display on a digital display screen. In order to convert the source image received in analog signal form to pixel data suitable for display on a digital display device, each horizontal scan line must be converted to a number of pixel data. For such a conversion, each horizontal scan line of analog data is sampled a predetermined number of times (HTOTAL) using a sampling clock signal (i.e., pixel clock). That is, the horizontal scan line is usually sampled during each cycle of the sampling clock. Accordingly, the sampling clock is designed to have a frequency such that the display portion of each horizontal scan line is sampled a desired number of times ($H_{TOTAL}$) that corresponds to the number of pixels on each horizontal display line of the display screen.

In general, a digital display unit needs to sample a received analog display signal to recover the pixel data elements from which the display signal was generated. For accurate recovery, the number of samples taken in each horizontal line needs to equal $H_{TOTAL}$. If the number of samples taken is not equal to $H_{TOTAL}$, the sampling may be inaccurate and resulting in any number and type of display artifacts (such as moire patterns).

Therefore what is desired is an efficient method and apparatus for determining a horizontal resolution of an analog video signal suitable for display on a fixed position pixel display such as an LCD.

SUMMARY OF THE INVENTION

According to the present invention, methods, apparatus, and systems are disclosed for determining a horizontal resolution of an analog video signal suitable for display on a fixed position pixel display such as an LCD.

In one embodiment, a method of determining a true horizontal resolution of an analog video signal arranged to display a number of features having associated feature edges on a display each of which were created with a true pixel clock is described. For a test horizontal resolution, if it is determined that substantially all of the feature edges have substantially the same phase relationship to a test pixel clock, then the test horizontal resolution is the true horizontal resolution.

In another embodiment, an apparatus for determining a true horizontal resolution of an analog video signal is described.

In yet another embodiment of the invention, an analog video signal synthesizer unit is described that includes a full display feature edge detector unit arranged to provide information used to calculate a horizontal resolution value corresponding to a video signal where the full display feature edge detector unit detects most positive rising edges of substantially all displayed features. The synthesizer also includes a temporal spacing calculator unit coupled to the full display feature edge detector unit that uses the detected feature edges to calculate an average temporal spacing value associated with the detected feature edges and a horizontal resolution calculator unit that calculates the horizontal resolution based upon a sample clock frequency $f_{sample}$ provided by a clock generator unit coupled thereto and the average temporal spacing value.

BRIEF DESCRIPTION OF TILE DRAWINGS

The invention will be better understood by reference to the following description taken in conjunction with the accompanying drawings.

FIG. 3B shows an over sampling mode ADC in a particular embodiment of the invention.

FIG. 4 that shows a feature having a number of feature edges.

Figure 5A:
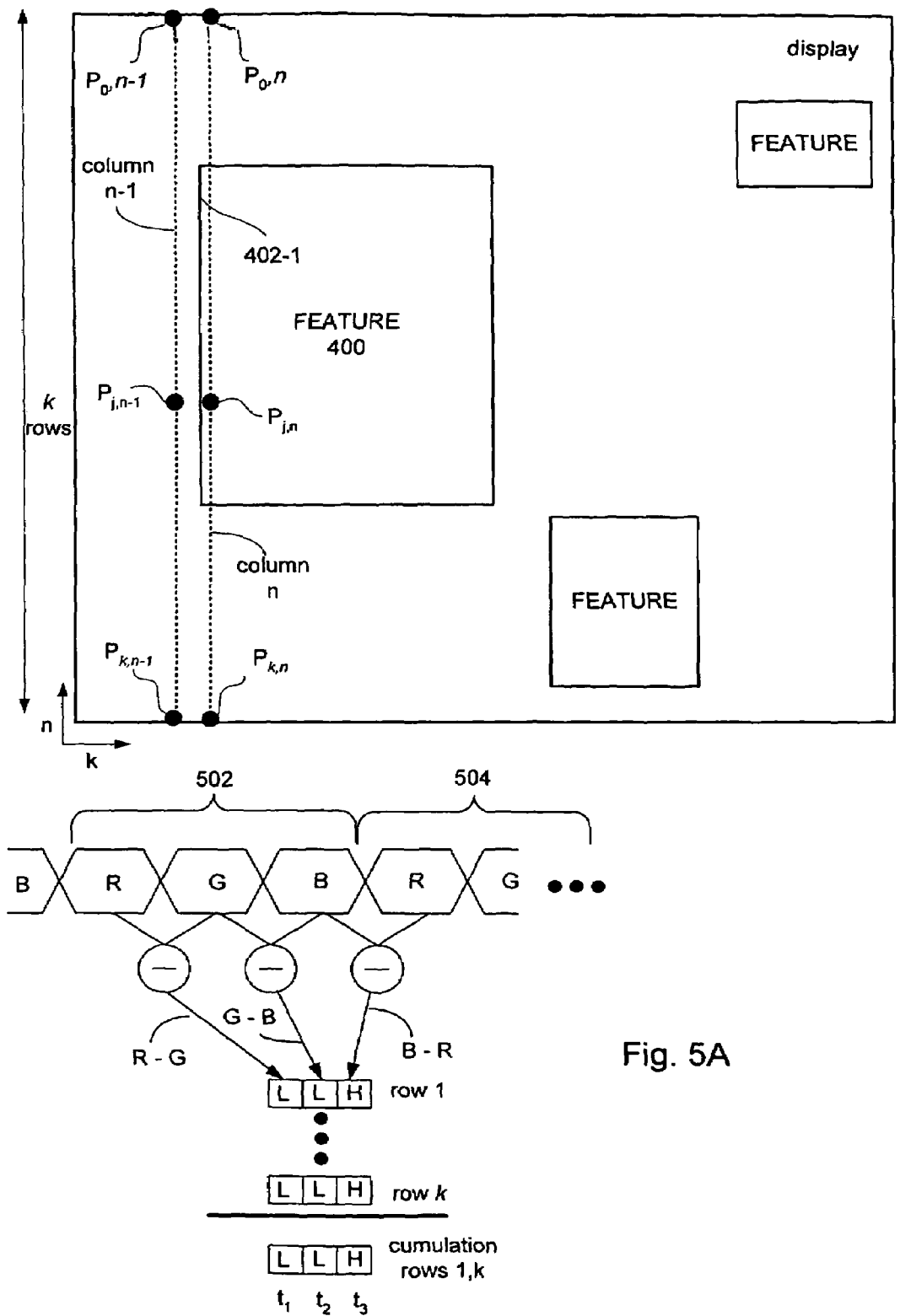

FIG. 5A shows the feature having the rising feature edge between adjacent columns.

Figure 5B:
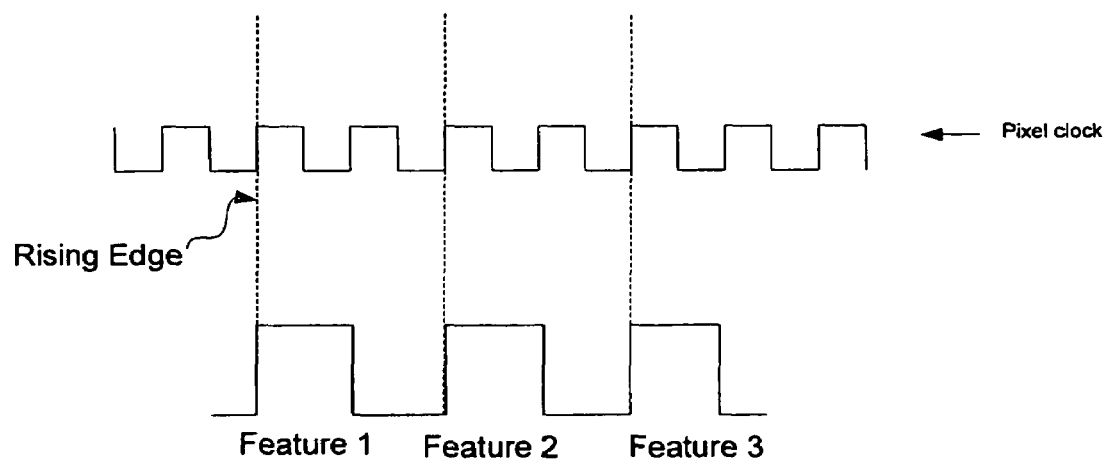

FIG. 5B shows the relationship between a number of displayed features and the pixel clock.

Figure 5C:
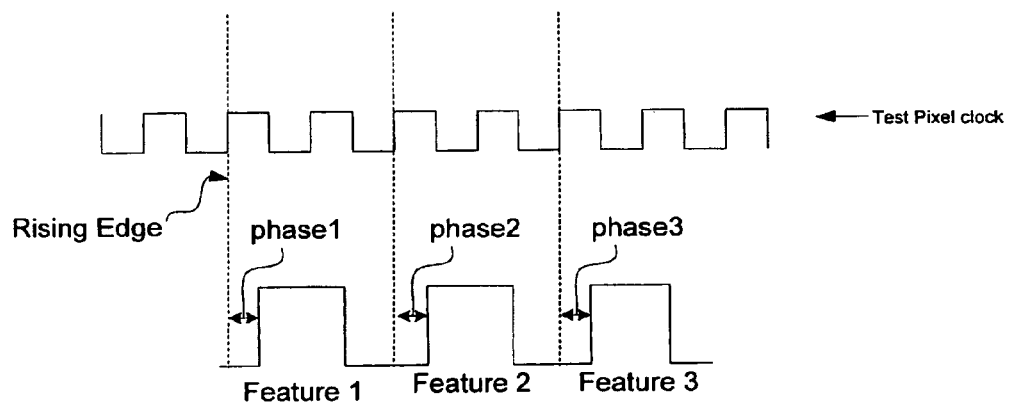

FIG. 5C shows the relationship between the displayed features and a test pixel clock when the test pixel clock is equal to the pixel clock of FIG. 5B.

FIG. 6 illustrates representative temporal spacing patterns for true $H_{total}$ and not true $H_{total}$.

Figure 1:
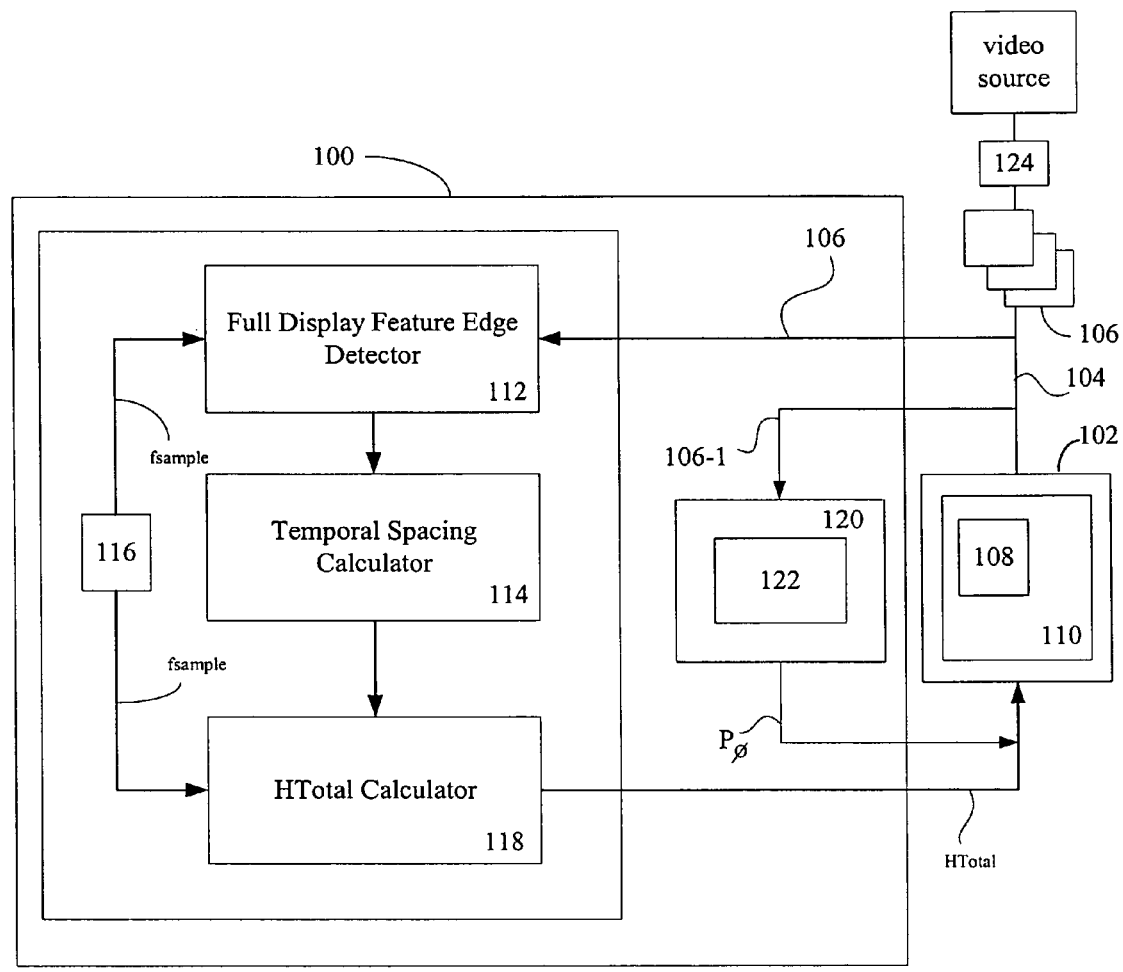
FIG. 1 shows an analog video signal synchronizer unit in accordance with an embodiment of the invention.
Figure 7:
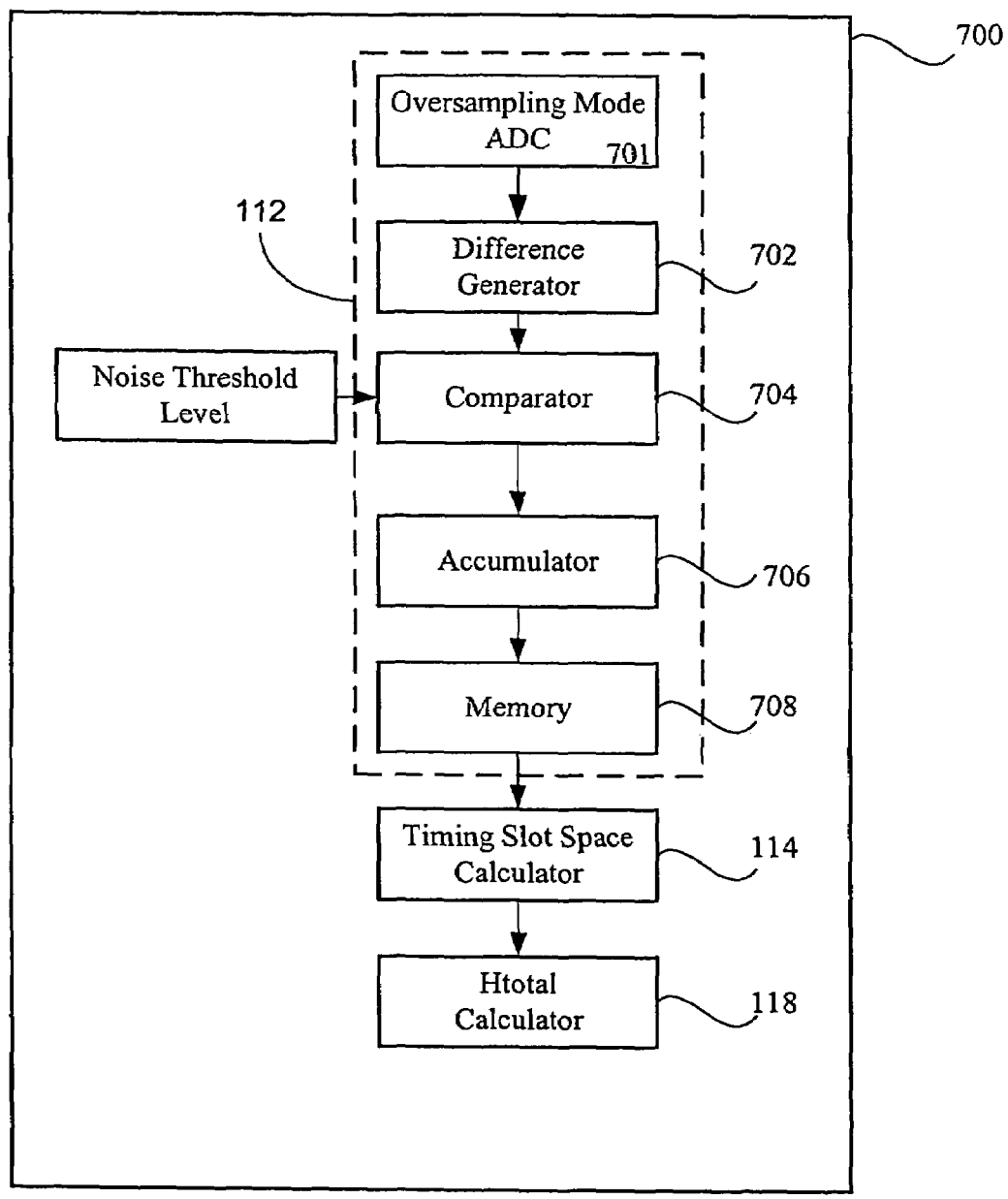

FIG. 7 illustrates a particular implementation of the full display feature edge detector shown in FIG. 1.

Figure 8:
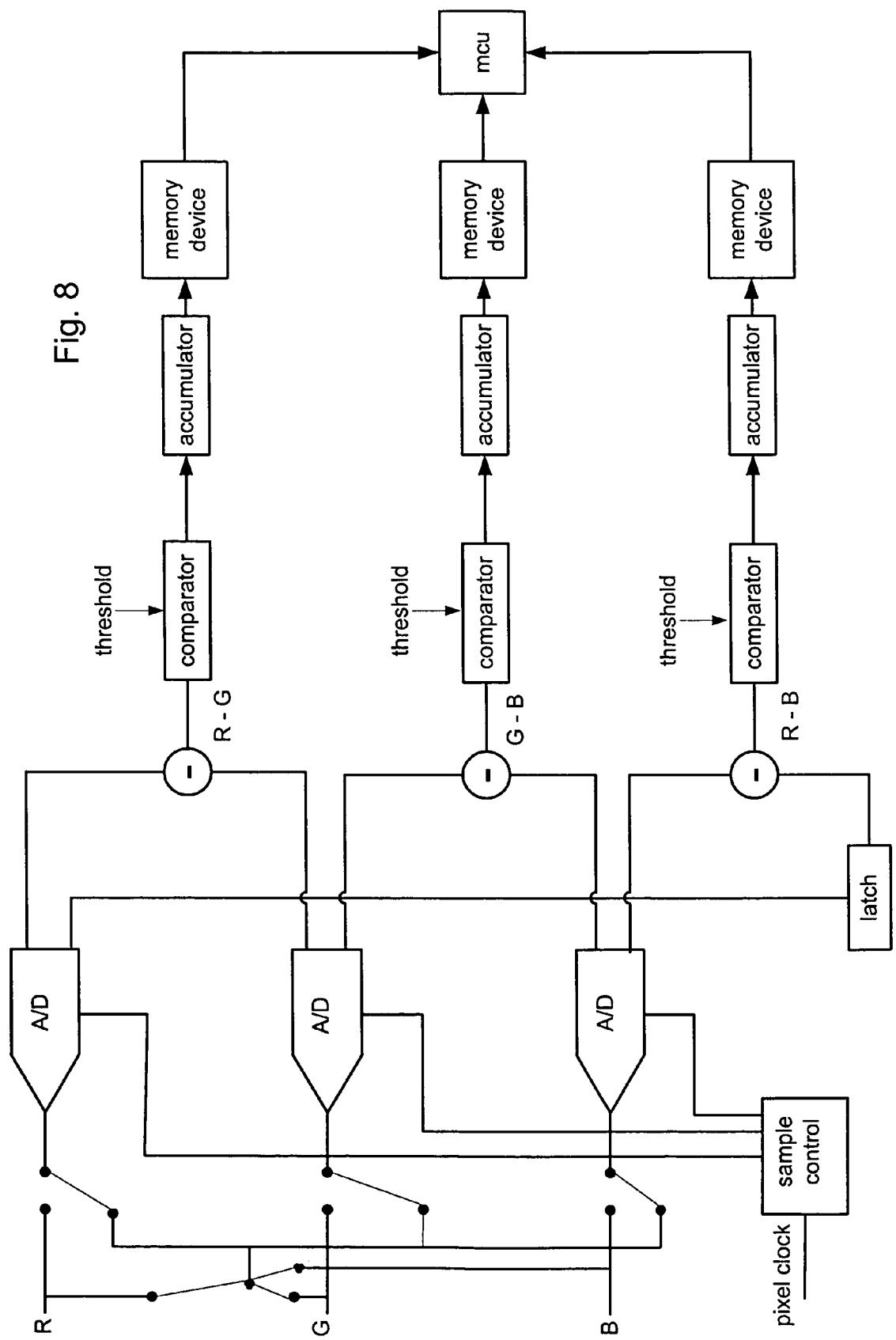

FIG. 8 illustrates yet another embodiment of the full display feature edge detector.

Figure 9:
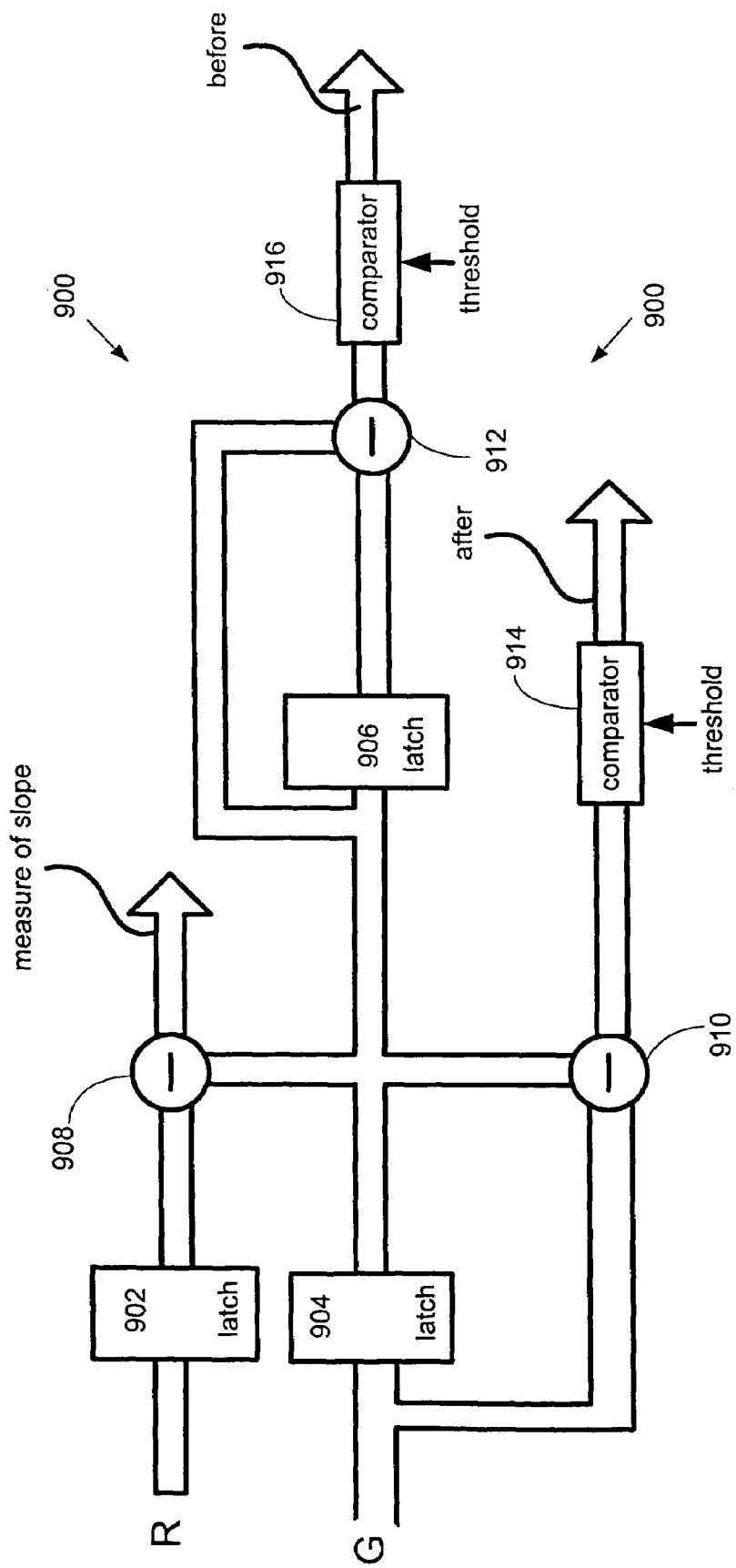

FIG. 9 illustrates a pixel clock estimator unit in accordance with an embodiment of the invention.

Figure 10:
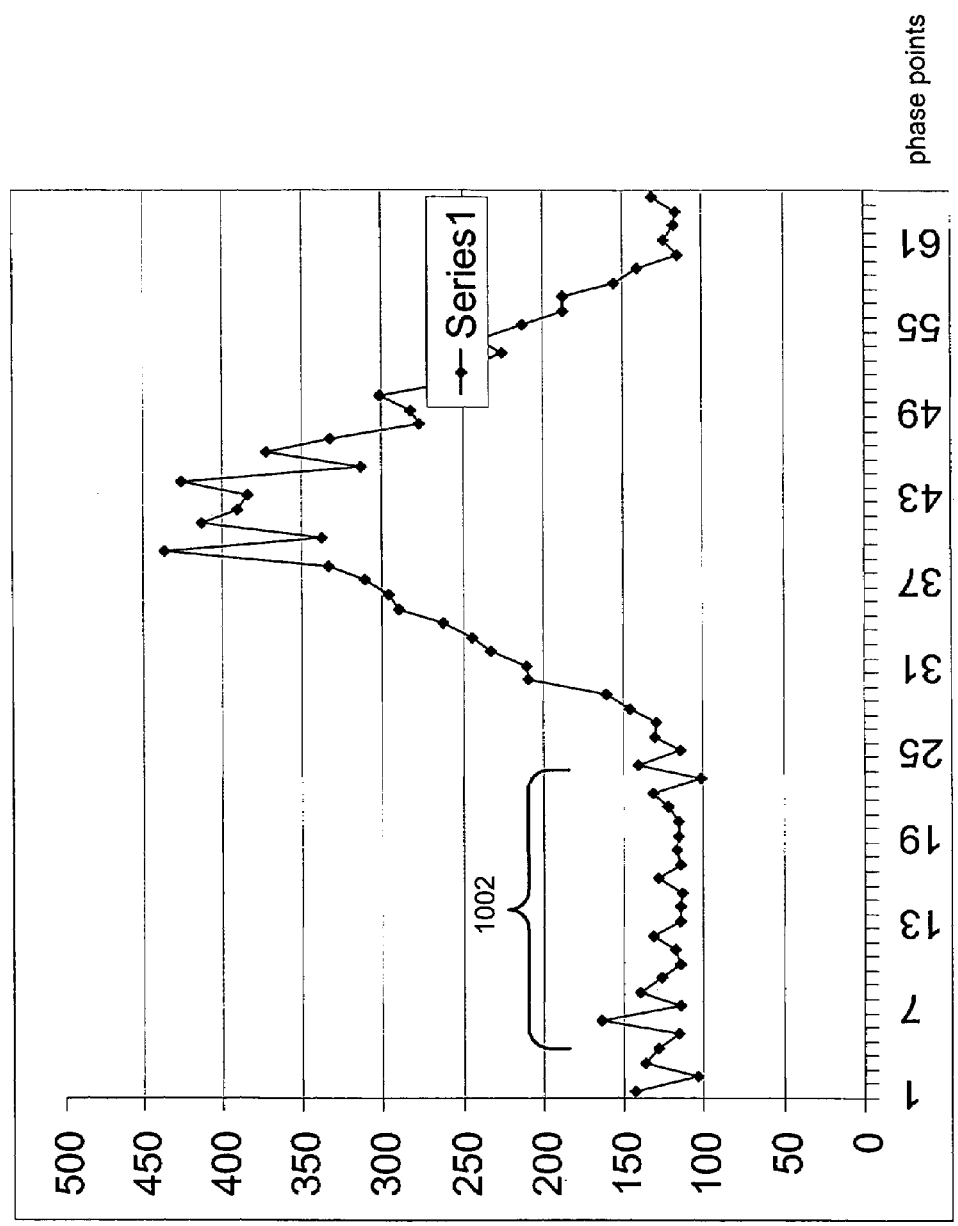

FIG. 10 is a graphical representation of a typical output response of the pixel clock estimator unit showing a flat region corresponding to a best pixel clock $P_\phi$.

Figure 11:
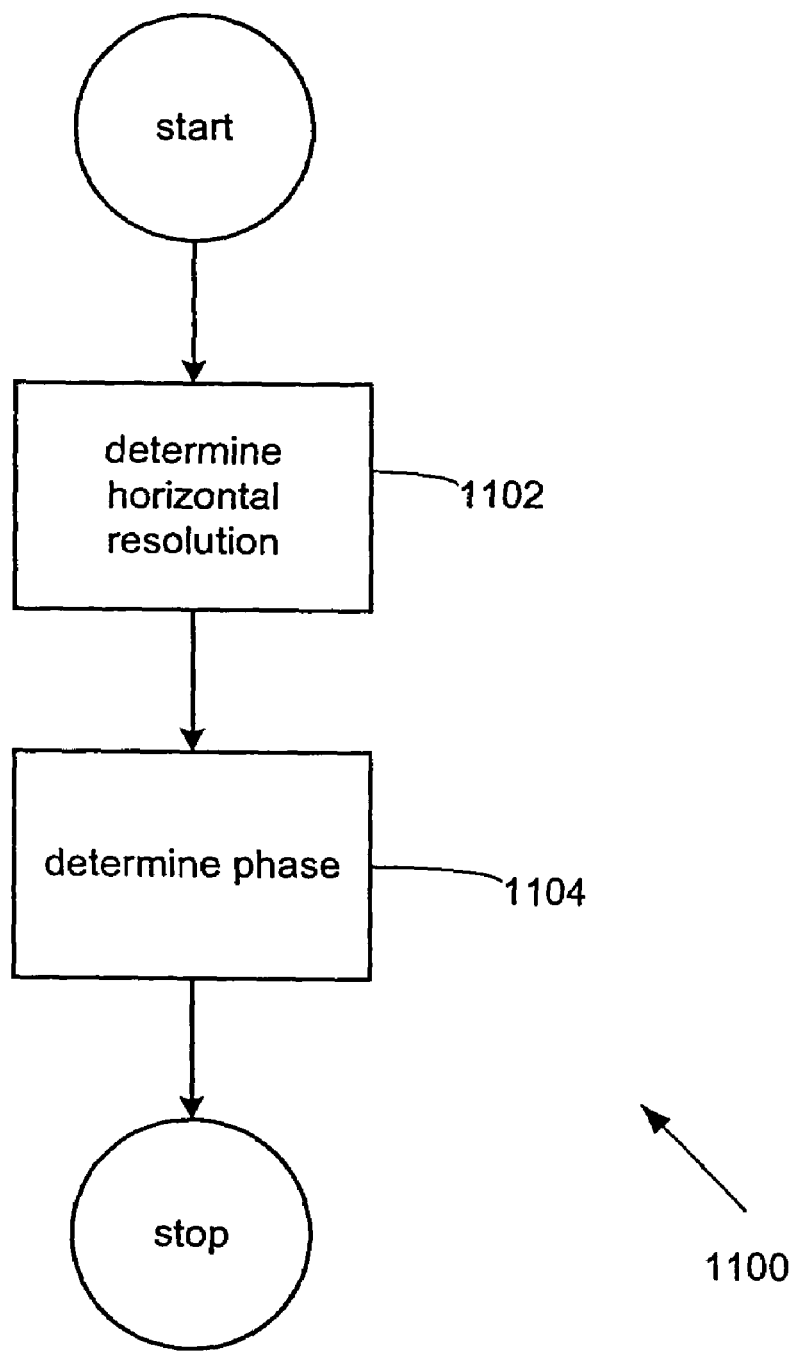

FIG. 11 details a process for synchronizing an analog video signal to an LCD monitor in accordance with an embodiment of the invention.

Figure 12:
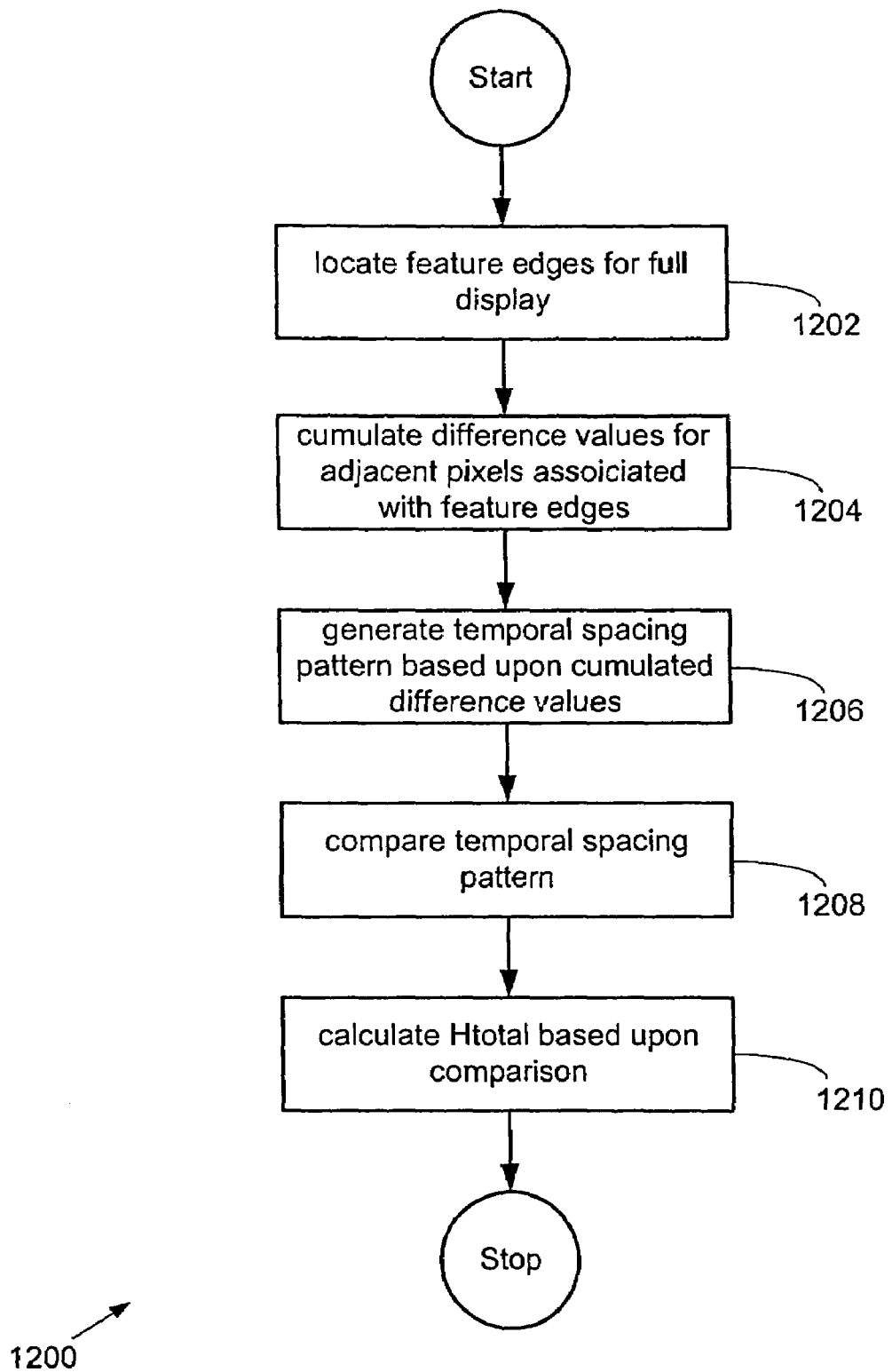

FIG. 12 illustrates a process for determining horizontal resolution in accordance with an embodiment of the invention.

Figure 13:
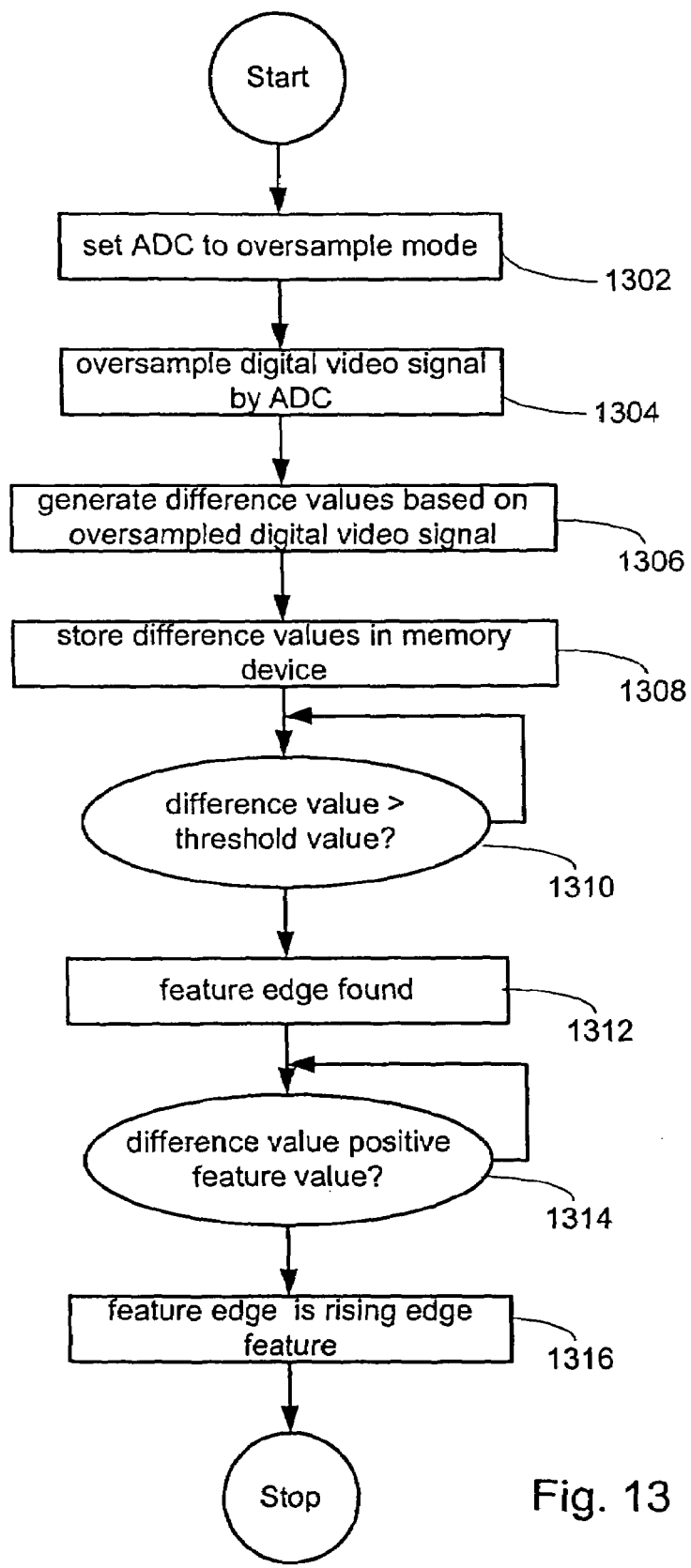

FIG. 13 shows a process for locating feature edges in a full display in accordance with an embodiment of the invention.

Figure 14:
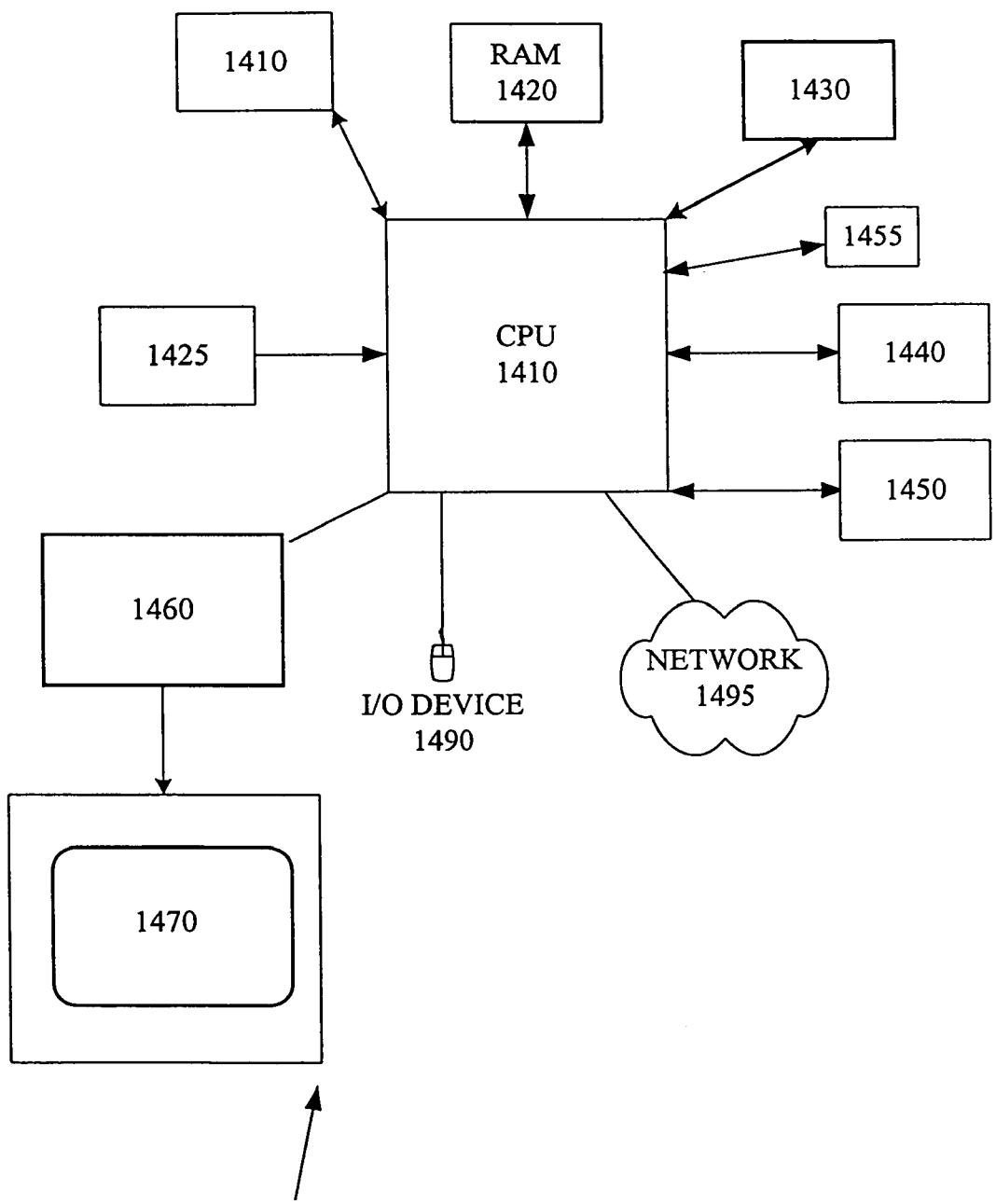

FIG. 14 illustrates a computer system employed to implement the invention.

DETAILED DESCRIPTION OF SELECTED EMBODIMENTS

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

In one embodiment, a method for determining a horizontal resolution ($H_{TOTAL}$) is described. In a video frame, a number of feature edges are found. A phase relationship of at least one of the number of feature edges is compared to a pixel clock and based upon the comparison, a horizontal resolution is provided.

The invention will now be described in terms of an analog video signal synchronizer unit capable of providing a horizontal resolution ($H_{TOTAL}$) and a pixel clock $P_\phi$ and methods thereof capable of being incorporated in an integrated semiconductor device well known to those skilled in the art. It should be noted, however, that the described embodiments are for illustrative purposes only and should not be construed as limiting either the scope or intent of the invention.

Accordingly, FIG. 1 shows an analog video signal synchronizer unit 100 in accordance with an embodiment of the invention. In the described embodiment, the analog video signal synchronizer unit 100 is coupled to an exemplary digital display 102 (which in this case is an LCD 102) capable of receiving and displaying an analog video signal 104 formed of a number of individual video frames 106 from analog video source (not shown). Typically, each video frame 106 includes video information displayed as a feature(s) 108 which, taken together, form a displayed image 110 on the display 102. It is these displayed features (and their associated edges) that are used to determine a horizontal resolution $H_{TOTAL}$ corresponding to the video signal 104 and the pixel clock $P_\phi$.

It should be noted that the analog video signal synchronizer unit 100 can be implemented in any number of ways, such as a integrated circuit, a pre-processor, or as programming code suitable for execution by a processor such as a central processing unit (CPU) and the like. In the embodiment described, the video signal synchronizer unit 100 is typically part of an input system, circuit, or software suitable for pre-processing video signals derived from the analog video source such as for example, an analog video camera and the like, that can also include a digital visual interface (DVI).

In the described embodiment, the analog video signal synthesizer unit 100 includes a full display feature edge detector unit 112 arranged to provide information used to calculate the horizontal resolution value ($H_{TOTAL}$) corresponding to the video signal 104. By full display it is meant that almost all of the pixels that go to form a single frame of the displayed image 110 are used to evaluate the horizontal resolution value $H_{TOTAL}$. Accordingly, during a display monitor initialization procedure (or when a display resolution has been changed from, for example, VGA to XGA) that is either manually or automatically instigated, the feature edge detector unit 112 receives at least one frame 106 of the video signal 104. In a particular implementation, the feature edge detector unit 112 detects all positive rising edges (described below) of substantially all displayed features during the at least one frame 106 using almost all of the displayed pixels, or picture elements, used to from the displayed image 110. Once the feature edge detector unit 112 has detected a number of feature edges, a temporal spacing calculator unit 114 coupled to the feature edge detector unit 112 uses the detected feature edges to calculate an average temporal spacing value associated with the detected feature edges. Based upon a sample clock frequency $f_{sample}$ provided by a clock generator unit 116 and the average temporal spacing value, an $H_{TOTAL}$ calculator unit 118 calculates the horizontal resolution $H_{TOTAL}$.

Figure 2:
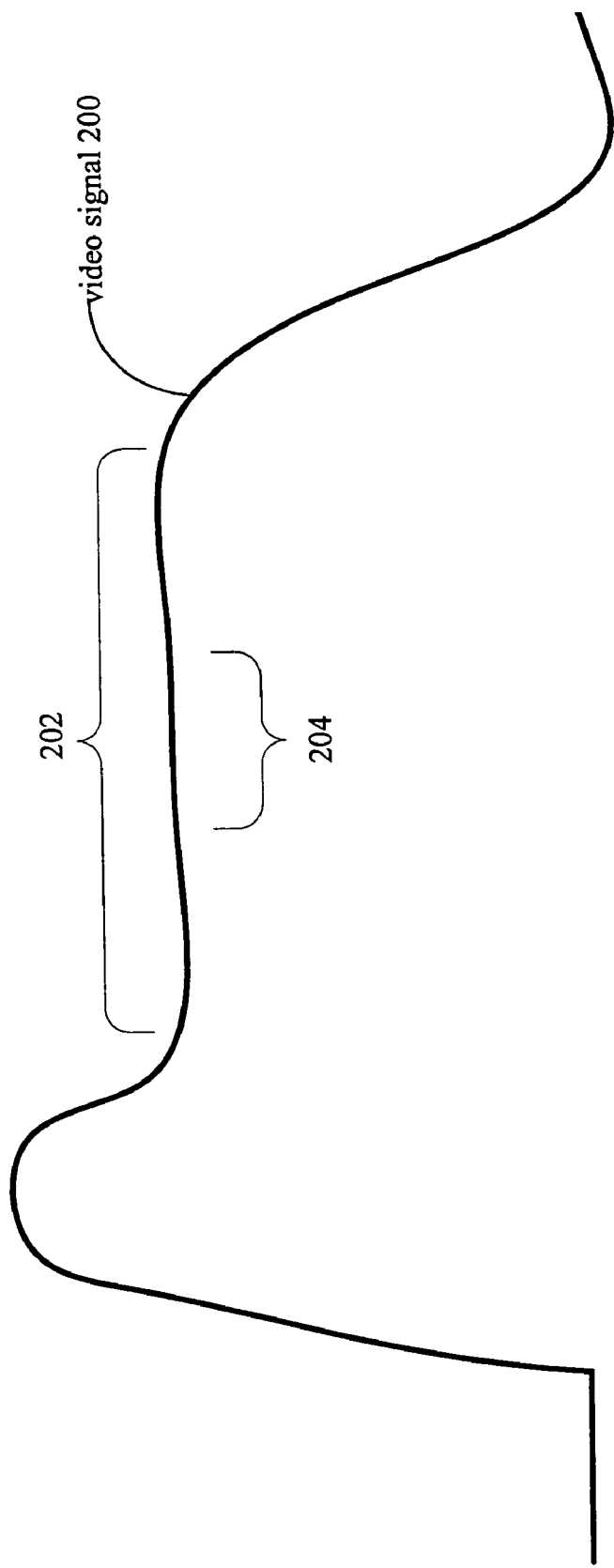
FIG. 2 shows a representative video signal.

In addition to calculating a best fit horizontal resolution $H_{TOTAL}$, the video signal synchronizer unit 100 also provides the pixel clock $P_\phi$ based upon the video signal 104 using a pixel clock estimator unit 120. The pixel clock estimator unit 120 estimates the pixel clock $P_\phi$ consistent with the video signal 104 using a flat region detector unit 122 that detects a flat region of the video signal 104 for a frame 106-1 (i.e., a different frame than is used to calculate the horizontal resolution $H_{TOTAL}$). For example, FIG. 2 shows a representative video signal 200 typically associated with a displayed feature having a flat region 202 characterized as that region of the signal 200 having a slope close to or equal to zero. Once the flat region has been established, the pixel clock $P_\phi$ is that pixel clock associated with a central portion 204 of the flat region 202.

In general, the video signal 104 is formed of three video channels (in an RGB based system, a Red channel (R), a Green channel (G), and a Blue channel (B)) such that when each is processed by a corresponding A/D converter, the resulting digital output is used to drive a respective sub-pixel (i.e., a (R) sub-pixel, a Green (G) sub-pixel, and a Blue (B) sub-pixel) all of which are used in combination to form a displayed pixel on the display 102 based upon a corresponding voltage level. For example, in those cases where each sub-pixel is capable of being driven by $2^8$ (i.e., 256) voltage levels a total of over 16 million colors can be displayed (representative of what is referred to as "true color"). For example, in the case of a liquid crystal display, or LCD, the B sub-pixel can be used to represent 256 levels of the color blue by varying the transparency of the liquid crystal which modulates the amount of light passing through the associated blue mask whereas the G sub-pixel can be used to represent 256 levels of the color green in substantially the same manner. It is for this reason that conventionally configured display monitors are structured in such a way that each display pixel is formed in fact of the 3 sub-pixels.

Referring back to FIG. 1, in the case where the video signal 104 is an analog video signal, an analog-to-digital converter (A/D) 124 is connected to the video image source. In the described embodiment, the A/D converter 124 converts an analog voltage or current signal into a digital video signal that can take the form of a waveform or as a discrete series of digitally encoded numbers forming in the process an appropriate pixel data word suitable for digital processing. It should be noted that any of a wide variety of A/D converters can be used. By way of example, various A/D converters include those manufactured by: Philips, Texas Instrument, Analog Devices, Brooktree, and others.

Figure 3A:
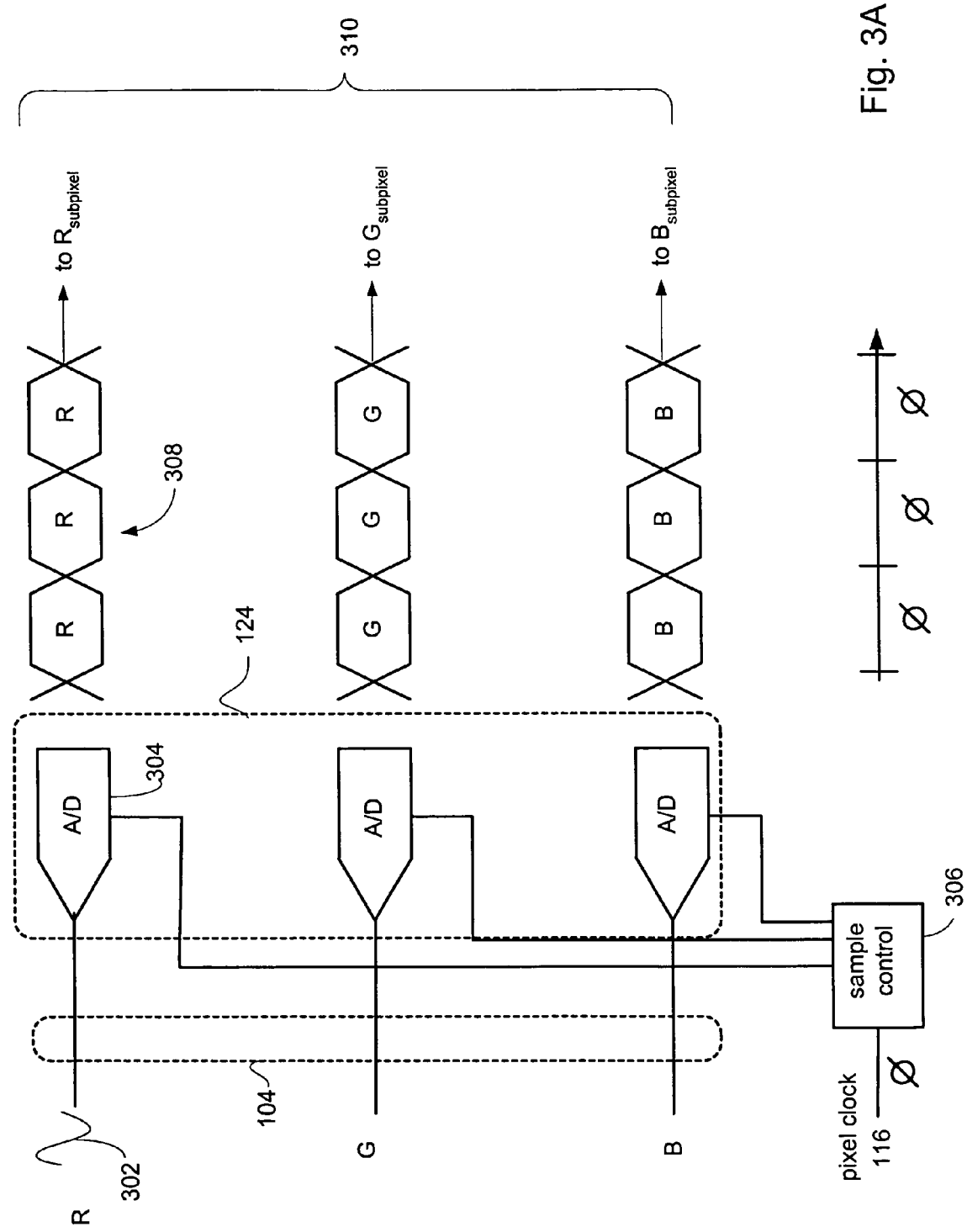
FIG. 3A illustrates the situation where each of the R,G,B channels has coupled thereto an associated A/D converter

Although an RGB based system is used in the subsequent discussion, the invention is well suited for any appropriate color space. FIG. 3A illustrates the situation where each of the R,G,B channels has coupled thereto an associated A/D converter (an arrangement well suited to preserve bandwidth) which taken together represent the A/D converter 124 shown in FIG. 1. Using the R video channel as an example, the R video channel passes an analog R video signal 302 to an associated R channel A/D converter 304. The R channel A/D converter 304, based upon a sample control signal provided by a sample control unit 306 coupled to the pixel clock generator 116, generates a digital R channel signal 308. This procedure is carried out for each of R,G,B video channels concurrently (i.e., during the same pixel clock cycle) such that for each pixel clock cycle, a digital RGB signal 310 is provided to each pixel of the display 102 (by way of its constituent sub-pixels).

In some cases, however, it may be desirable to over sample the incoming video signal in order to provide a resolution greater than one pixel (as is the case shown in FIG. 3A). Accordingly, in an over sampling mode provided in a particular embodiment of the invention as shown in FIG. 3B, each of the R,G,B, A/D converters and ganged together in such a way that all three video channels are combined to form a single 3× over sampled output signal 312. In this way, it is possible to resolve features and their associated feature edges to a resolution of ⅓ of a pixel (i.e., to the sub-pixel level) thereby greatly enhancing the ability to detect feature edges in a single frame, if necessary.

Our attention is now directed to FIG. 4 that shows a feature 400 having a number of feature edges 402. A description of a particular approach to ascertaining if a feature edge is a rising feature edge based upon the characterization of a constituent pixel as a rising edge pixel is hereby presented. In the context of the invention, in order to characterize a feature edge 402-1 as a rising edge, a first pixel video signal value $P_{2val}$ associated with a first pixel $P_2$ in a column n−1 is determined and compared to a second pixel video signal value $P_{1val}$ associated with a second pixel a second pixel $P_1$ in an immediately adjacent column n. In the described embodiment, the compare operation is a difference operation according to equation 1:

$$\text{difference} = P_{1val} - P_{2val} \qquad \text{eq (1)}$$

If the difference value is positive, then the second pixel $P_1$ corresponds to what is referred to as a rising edge type pixel associated with a rising edge feature. Conversely, if the value of difference value is negative, then the second pixel $P_1$ corresponds to a falling edge pixel corresponding to a falling edge feature which is illustrated with respect to pixels $P_3$ and $P_4$ (where $P_3$ is the falling edge pixel). Using this approach, during at least a single video frame, every pixel in the display can be evaluated to whether it is associated with an edge and if so whether that edge is a rising edge or a falling edge. For example, typically an edge is characterized by a comparatively large difference value associated with two adjacent pixels since any two adjacent pixels that are in a blank region or within a feature will have a difference value of approximately zero. Therefore, any edge can be detected by cumulating most, if not all, of the difference values for a particular pair of adjacent columns. If the sum of differences for a particular column is a value greater than a predetermined threshold (for noise suppression purposes), then a conclusion can be drawn that a feature edge is located between the two adjacent columns.

Once a rising feature edge has been found, a determination of $H_{TOTAL}$ can be made since all features were created using the same pixel clock and consequently all edges should be synchronous to the pixel clock and the phase relationship between edges of clock and edges of video signal should be same. In other words, if substantially all of the feature edges have substantially the same phase relationship to a test pixel clock, then the test horizontal resolution is the true horizontal resolution, otherwise the test horizontal resolution is likely to be incorrect. Therefore, once all edges (or in some cases a minimum predetermined number of rising edges) in a frame have been located, then a determination is made whether or not the phase relationship between the edges of the pixel clock and the edges of the video signals corresponding to the feature edges are substantially the same. In one embodiment, an over sampled digital video signal corresponding to the displayed features is input to an arithmetic difference circuit which generates a measure of a difference between each successive over sampled pixel. In the case where the estimated $H_{TOTAL}$ is a true $H_{TOTAL}$ (i.e., corresponds to the pixel clock used to create the displayed features), then each the difference values for the feature edges should always appear in same time slot. By accumulating the difference values for adjacent pixels for an entire frame, a plot of difference values can be generated where each x coordinate of the plot corresponds to a displayed column having a value corresponding to a sum of the difference values for that column for adjacent over sampled pixels. In the case where a particular column contains a feature edge, then the difference results for only one time slot (of the three time slots in the case of 3× over sampling) should be a high (H) value indicating the presence of the feature edge whereas the other two time slots will contain a low (L) value.

For example, FIG. 5A shows the feature 400 having the rising feature edge 402-1 between adjacent column n-1 and column n where each column is formed of k pixels (one for each of the k rows). In the case of a 3× over sampled digital video signal 312, for each row k, an adjacent over sample pixel values are differenced (i.e., subtracted from one another as described above). For example, in the jth row (1<j<k) and n-1 column, pixel $Pj_{,n-1}$ has an associated over sampled pixel value 502 whereas an adjacent pixel $P_{j,n}$ has an associated over sampled pixel value 504. Differencing pixel values 502 and 504 results in a low (L) difference value in a first time slot $t_1$, a low (L) difference value in a second time slot $t_2$, and a high (H) difference value in a third time slot $t_3$. It should be noted that the high difference value is due to the fact that the high difference value represents the difference between the pixel $Pj_{,n-j}$ and the pixel $P_{j,n}$ which is part of the feature 402 is a rising edge type pixel.

FIG. 5B shows the relationship between a number of displayed features and the pixel clock. FIG. 5C shows the relationship between the displayed features and a test pixel clock when the test pixel clock is the pixel clock of FIG. 5B.

In this way, any feature edge 402-1 is characterized by a cumulated sum having a pattern of "L L H" having a temporal spacing of approximately 3.0 (corresponding to the spacing between each of the "H" values associated with each of the feature edges in the display). If, however, the estimated $H_{TOTAL}$ is not the true $H_{TOTAL}$, then the observed temporal spacing will not be 3.0. (Please refer to FIG. 6 showing just such a case where a test $H_{TOTAL}$ is not the true $H_{TOTAL}$ resulting in a temporal spacing that is not 3.0.) In this case, the true $H_{TOTAL}$ is related to the estimated $H_{TOTAL}$ based upon equation (2):

$$\{H_{TOTAL}(\text{test})/H_{TOTAL}(\text{true})\} = \{\text{average spacing}/3.0\} \quad \text{Eq. (2)}$$

Therefore, once the temporal spacing is calculated by the temporal spacing calculator 114, a true $H_{TOTAL}$ can be calculated by the $H_{TOTAL}$ calculator unit 118

In some embodiments, the total number of features are tallied and compared to a minimum number of features. In some embodiments, this minimum number can be as low as four or as high as 10 depending on the situation at hand. This is done in order to optimize the ability to ascertain $H_{TOTAL}$ since too few found features can provide inconsistent results.

The following discussion describes a particular implementation 700 shown in FIG. 7 of the full display feature edge detector 112 in accordance with an embodiment of the invention. It should be noted, however, that the described operation is only one possible implementation and should therefore not be considered to be limiting either the scope or intent of the invention. Accordingly, the full display feature edge detector 112 includes an over sampling mode ADC 701 configured to produce a over sampled digital video signal. (It is contemplated that the ADC 701 can be a separate component fully dedicated to generating the over sampled digital signal or, more likely, is a selectable version of the ADC 124.)

The ADC 701 is, in turn, connected to a difference generator unit 702 arranged to receive the digital over sampled video signal from the ADC 701 and generate a set of difference result values. It should be noted that the ADC 124 is configured to provide the over sample digital video signal 312 for pre-selected period of time (usually a period of time equivalent to a single frame of video data). The difference generator unit 702 is, in turn, connected to a comparator unit 704 that compares the resulting difference result value to predetermined noise threshold level value(s) in order to eliminate erroneous results based upon spurious noise signals. In the described embodiment, the output of the comparator unit 704 is connected to an accumulator unit 706 that is used to accumulate the difference results for substantially all displayed pixels in a single frame which are subsequently stored in a memory device 708.

Once the difference result values for an entire frame have been captured and stored in the memory device 708, the time slot space calculator unit 114 coupled thereto queries the stored difference result values and determines a difference result values pattern. Once the difference results values pattern has been established, a determination of a best fit $H_{TOTAL}$ value is made by the $H_{TOTAL}$ calculator unit 118 based upon the observed time slot spacing of the difference results values pattern provided.

FIG. 8 illustrates yet another embodiment of the full display feature edge detector 112.

Subsequent to calculating a best fit horizontal resolution $H_{TOTAL}$, the video signal synchronizer unit 100 also provides pixel clock (phase) $P_\phi$ based upon the video signal 104 using a pixel clock estimator unit 900 shown in FIG. 9. It should be noted that the pixel clock estimator unit 900 is a particular implementation of the pixel clock estimator unit 120 shown in FIG. 1 and therefore should not be construed as limiting either the scope or intent of the invention. It should also be noted that the pixel clock estimator unit 900 utilizes in the case of a three channel video signal (such as RGB) only two of the three channels to determining the best fit clock.

In the described embodiment, the pixel clock estimator unit 900 estimates the pixel clock $P_\phi$ consistent with the video signal 104 using a flat region detector unit that detects a flat region of the video signal 104 for a frame 106-1 (i.e., a different frame than is used to calculate the horizontal resolution $H_{TOTAL}$). The flat region detector unit 122 provides a measure of a video signal slope using at least two of three input video signals that are latched by one pixel clock cycle.

Utilizing only the R and G video channels, for example, the flat region detector essentially monitors the same input channel (but off by one phase step or about 200 pS by the use of ADC sample control 306) such that any difference detected by a difference circuits coupled thereto is a measure of the slope at a particular phase of the video signal. The pixel clock estimator 900, therefore, validates only those slope values near an edge (i.e., both before and after) which are then accumulated as a before edge slope value, a before slope count value, an after edge slope value and an after edge count value. Once all the slopes have been determined, an average slope for each column is then calculated providing an estimate of the flat region of the video signal. In the described embodiment, the $H_{TOTAL}$ value is offset by a predetermined amount such that a particular number of phase points are evaluated for flatness. For example, if the $H_{TOTAL}$ is offset from the true $H_{TOTAL}$ by 1/64, the each real pixel rolls through 64 different phase points each of whose flatness can be determined and therefore used to evaluate the pixel clock $P_\phi$.

With reference to FIG. 9, the R video channel and the G video channel are each coupled to a data latch circuit 902 and 904. In this way a previous R and G video signal are respectively stored and made available for comparison to a set of current R and G video signals. A difference circuit 908 provides a video signal slope value whereas a difference circuit 910 provides an after edge slope value and a difference circuit 912 provides a before edge slope value for substantially all pixels in the display. In a particular embodiment, comparator units 914 and 916 provide noise suppression by comparing the before edge and the after edge slope values with a predetermined threshold value thereby improving overall accuracy of the estimator unit 900.

FIG. 10 is a graphical representation of a typical output response of the pixel clock estimator unit 900 showing a flat region 1002 corresponding to a best pixel clock $P_\phi$.

FIGS. 11–13 describe a process 1100 for synchronizing an analog video signal to an LCD monitor in accordance with an embodiment of the invention. As shown in FIG. 11, the process 1100 begins at 1102 by determining a horizontal resolution and at 1104 by determining a phase based in part upon the determined horizontal resolution. FIG. 12 illustrates a process 1200 for determining horizontal resolution in accordance with an embodiment of the invention. The process 1200 begins at 1202 by locating feature edges and at 1204 the difference values are cumulated in a column wise basis and based upon the cumulated difference values, a temporal spacing pattern is generated at 1206. The temporal spacing pattern is then compared at 1208 to a reference pattern associated with the true Htotal and at 1210 a best fit Htotal is calculated based upon the compare.

FIG. 13 shows a process 1300 for locating feature edges in a full display in accordance with an embodiment of the invention. The process 1300 begins at 1302 by setting an ADC to an over sample mode. It should be noted that in those situations where a dedicated oversampler is provided, then 1302 is optional. At 1304, a over sampled digital video is provided by the ADC while at 1306 a set of difference values based upon the over sampled digital video signal is generated. At 1308, the difference values are stored in memory while at 1310, the difference values are compared to a feature edge threshold value. If the difference value is greater than the feature edge threshold value, then the difference value is associated with an edge and a feature edge has been located at 1312. Once a feature edge has been located, a determination is made at 1314 if the found feature edge is a rising feature edge by determining if the difference value is positive indicating a rising feature edge. If the difference value is positive, then the feature edge is marked a rising feature edge at 1316.

FIG. 14 illustrates a computer system 1400 employed to implement the invention. Computer system 1400 is only an example of a graphics system in which the present invention can be implemented. Computer system 1400 includes central processing unit (CPU) 1410, random access memory (RAM) 1420, read only memory (ROM) 1425, one or more peripherals 1430, graphics controller 1460, primary storage devices 1440 and 1450, and digital display unit 1470. As is well known in the art, ROM acts to transfer data and instructions uni-directionally to the CPUs 1410, while RAM is used typically to transfer data and instructions in a bi-directional manner. CPUs 1410 may generally include any number of processors. Both primary storage devices 1440 and 1450 may include any suitable computer-readable media. A secondary storage medium 1455, which is typically a mass memory device, is also coupled bi-directionally to CPUs 1410 and provides additional data storage capacity. The mass memory device 1455 is a computer-readable medium that may be used to store programs including computer code, data, and the like. Typically, mass memory device 880 is a storage medium such as a hard disk or a tape which generally slower than primary storage devices 1440, 1450. Mass memory storage device 1455 may take the form of a magnetic or paper tape reader or some other well-known device. It will be appreciated that the information retained within the mass memory device 1455, may, in appropriate cases, be incorporated in standard fashion as part of RAM 1420 as virtual memory.

CPUs 1410 are also coupled to one or more input/output devices 1490 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1410 optionally may be coupled to a computer or telecommunications network, e.g., an Internet network or an intranet network, using a network connection as shown generally at 1495. With such a network connection, it is contemplated that the CPUs 1410 might receive information from the network, or might output information to the network in the course of performing the above-described method steps. Such information, which is often represented as a sequence of instructions to be executed using CPUs 1410, may be received from and outputted to the network, for example, in the form of a computer data signal embodied in a carrier wave. The above-described devices and materials will be familiar to those of skill in the computer hardware and software arts.

Graphics controller 1460 generates analog image data and a corresponding reference signal, and provides both to digital display unit 1470. The analog image data can be generated, for example, based on pixel data received from CPU 1410 or from an external encode (not shown). In one embodiment, the analog image data is provided in RGB format and the reference signal includes the VSYNC and HSYNC signals well known in the art. However, it should be understood that the present invention can be implemented with analog image, data and/or reference signals in other formats. For example, analog image data can include video signal data also with a corresponding time reference signal.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

While this invention has been described in terms of a preferred embodiment, there are alterations, permutations, and equivalents that fall within the scope of this invention. It should also be noted that there are may alternative ways of implementing both the process and apparatus of the present invention. It is therefore intended that the invention be interpreted as including all such alterations, permutations, and equivalents as fall within the true spirit and scope of the present invention.

What is claimed is:

1. A method of determining a true horizontal resolution of an analog video signal arranged to display a number of features which, when taken together, form a displayed image, the features having associated feature edges on a display each of which were created with a true pixel clock, the method comprising:

for a test horizontal resolution,
determining if a minimum predetermined number of the feature edges have the same phase relationship to a test pixel clock, then the test horizontal resolution is the true horizontal resolution.

2. A method as recited in claim 1, further comprising:
in a video frame,
finding at least one of the number of feature edges associated with at least one feature;
comparing a phase relationship of the at least one of the number of feature edges to the test pixel clock.

3. A method as recited in claim 2, wherein the finding comprises:
generating an oversampled video signal;
comparing adjacent oversampled video signals to form a difference value;
comparing the difference value to a pre-determined threshold value; and
flagging the adjacent pixels as the feature edge when the associated difference value is greater than or equal to the threshold value.

4. A method as recited in claim 3, wherein the comparing comprises:
cumulating the difference values associated with the feature edge; and
generating a temporal spacing pattern based upon the cumulating.

5. A method as recited in claim 4, wherein the determining comprises:
comparing the temporal spacing pattern to a reference temporal spacing pattern corresponding to the true horizontal resolution.

6. A method as recited in claim 5, wherein when the temporal spacing pattern is substantially equal to the reference temporal spacing pattern, then the test horizontal resolution is the true horizontal resolution.

7. A method as recited in claim 1, wherein the feature edge is a rising feature edge.

8. An apparatus for determining a true horizontal resolution of an analog video signal arranged to display a number of features which, when taken together, form a displayed image, the features having associated feature edges on a display each of which were created with a true pixel clock, the method comprising:
for a test horizontal resolution,
means for determining if a minimum predetermined number of the feature edges have the same phase relationship to a test pixel clock, then the test horizontal resolution is the true horizontal resolution.

9. An apparatus as recited in claim 8, further comprising:
means for finding at least one of the number of feature edges associated with at least one feature in a video frame;
means for comparing a phase relationship of the at least one of the number of feature edges to the test pixel clock.

10. An apparatus as recited in claim 9, wherein the means for finding comprises:
means for generating an oversampled video signal;
means for comparing adjacent oversampled video signals to form a difference value;
means for comparing the difference value to a pre-determined threshold value; and
means for flagging the adjacent pixels as the feature edge when the associated difference value is greater than or equal to the threshold value.

11. An apparatus as recited in claim 10, wherein the means for comparing comprises:
means for cumulating the difference values associated with the feature edge; and
means for generating a temporal spacing pattern based upon the cumulating.

12. An apparatus as recited in claim 11, wherein the determining comprises:
means for comparing the temporal spacing pattern to a reference temporal spacing pattern corresponding to the true horizontal resolution.

13. An apparatus as recited in claim 12, wherein when the temporal spacing pattern is substantially equal to the reference temporal spacing pattern, then the test horizontal resolution is the true horizontal resolution.

14. An apparatus as recited in claim 8, wherein the feature edge is a rising feature edge.

15. An analog video signal synthesizer unit, comprising:
a video signal oversampling unit arranged to oversample a video signal by an oversampling factor n, the video signal arranged to display a number of features which, when taken together, form a displayed image, the features having associated feature edges each of which were created with a true pixel clock;
a full display feature edge detector unit coupled to the video signal oversampling unit arranged to provide information used to calculate a horizontal resolution value ($H_{TOTAL}$) corresponding to the video signal, wherein the full display feature edge detector unit detects positive rising edges of a number of displayed features;
a temporal spacing calculator unit coupled to the full display feature edge detector unit that uses the detected feature edges to calculate an average temporal spacing value associated with the detected feature edges; and
a horizontal resolution calculator unit coupled to the temporal spacing calculator unit that calculates the horizontal resolution based upon a sample clock frequency $f_{sample}$ provided by a clock generator unit coupled thereto and the average temporal spacing value when the average temporal spacing value is about equal to the oversampling factor n.

16. An analog video signal synthesizer unit as recited in claim 15 wherein the video synthesizer unit is coupled to an digital display.

17. An analog video signal synthesizer unit as recited in claim 16, wherein the digital display is an LCD capable of receiving and displaying an analog video signal formed of a number of individual video frames from an analog video source.

18. An analog video signal synthesizer unit as recited in claim 17 wherein each video frame includes video information displayed as the displayed features taken together form a displayed image on the display LCD.

19. An analog video signal synthesizer unit as recited in claim 15, wherein the analog video signal synthesizer unit is a pre-processor.

20. An analog video signal synthesizer unit as recited in claim 19 wherein, the video signal synchronizer unit is included in an input system suitably arranged for pre-processing video signals derived from the analog video source.

21. An analog video signal synthesizer unit as recited in claim 20 wherein the analog video source is an analog video camera.

22. An analog video signal synthesizer unit as recited in claim 15, wherein the analog video signal synthesizer unit is an integrated circuit.

23. An analog video signal synthesizer as recited in claim 15, wherein analog video signal synthesizer is active during a display monitor initialization procedure.

24. An analog video signal synthesizer as recited in claim 23 wherein the analog video signal synthesizer is activated either manually or automatically.

25. An analog video signal synthesizer as recited in claim 15, wherein analog video signal synthesizer is active when a display resolution has been changed from a first resolution to a second resolution, and vice versa.

26. An analog video signal synthesizer as recited in claim 25, wherein the first resolution is VGA and the second resolution is XGA.

* * * * *